United States Patent
Yoon et al.

(10) Patent No.: US 11,888,327 B2
(45) Date of Patent: Jan. 30, 2024

(54) HIGH EFFICIENCY METASURFACE-BASED MULTI-SCALE WIRELESS POWER TRANSFER

(71) Applicant: University of Florida Research Foundation, Inc., Gainesville, FL (US)

(72) Inventors: Yong Kyu Yoon, Gainesville, FL (US); Woosol Lee, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 9 days.

(21) Appl. No.: 17/705,734

(22) Filed: Mar. 28, 2022

(65) Prior Publication Data
US 2022/0320908 A1    Oct. 6, 2022

Related U.S. Application Data

(60) Provisional application No. 63/167,994, filed on Mar. 30, 2021.

(51) Int. Cl.
*H02J 50/12* (2016.01)
*H02J 50/00* (2016.01)

(52) U.S. Cl.
CPC ............ *H02J 50/12* (2016.02); *H02J 50/005* (2020.01)

(58) Field of Classification Search
CPC ................. H02J 50/005; H02J 50/12
See application file for complete search history.

(56) References Cited

U.S. PATENT DOCUMENTS

| | | | | |
|---|---|---|---|---|
| 10,050,344 | B2* | 8/2018 | Black | H01Q 3/44 |
| 10,312,597 | B2* | 6/2019 | Savage | H01Q 15/02 |
| 2011/0133568 | A1* | 6/2011 | Wang | H02J 50/90 |
| | | | | 307/104 |
| 2011/0266879 | A1* | 11/2011 | Kim | H02J 50/12 |
| | | | | 307/104 |
| 2011/0267247 | A1* | 11/2011 | Choi | H01Q 15/0086 |
| | | | | 343/753 |
| 2013/0134791 | A1* | 5/2013 | Park | H01F 38/14 |
| | | | | 307/104 |
| 2014/0159479 | A1* | 6/2014 | Nomura | B60L 53/126 |
| | | | | 307/9.1 |
| 2016/0087458 | A1* | 3/2016 | Grbic | H02J 50/12 |
| | | | | 307/104 |
| 2017/0069969 | A1* | 3/2017 | Black | H02J 50/60 |
| 2017/0141582 | A1* | 5/2017 | Adolf | H02J 50/05 |

(Continued)

*Primary Examiner* — Rexford N Barnie
*Assistant Examiner* — Joseph N Inge
(74) *Attorney, Agent, or Firm* — Thomas | Horstemeyer, LLP

(57) ABSTRACT

The present disclosure provides wireless power transfer systems and methods. One such system includes a transmitter comprising a transmitter coil coupled to a power source and a transmitter metasurface slab positioned on a front side of the transmitter coil that is configured to amplify and focus a magnetic field generated by the transmitter coil towards a receiver in a non-contact manner. In such a system, the receiver comprises a receiver coil coupled to a load and a receiver metasurface slab positioned on a front side of the receiver coil configured to amplify and focus a magnetic field generated by the transmitter coil towards the receiver coil in a non-contact manner. Other systems and methods are also provided.

20 Claims, 14 Drawing Sheets

(56) References Cited

U.S. PATENT DOCUMENTS

| | | | | |
|---|---|---|---|---|
| 2017/0237299 | A1* | 8/2017 | Yoo | H01Q 19/30 |
| | | | | 307/104 |
| 2018/0323511 | A1* | 11/2018 | Urzhumov | H01Q 3/2605 |
| 2019/0372234 | A1* | 12/2019 | Lipworth | H01Q 15/002 |
| 2020/0067187 | A1* | 2/2020 | Reynolds | B64C 39/024 |
| 2021/0143555 | A1* | 5/2021 | Akselrod | H01Q 15/0053 |
| 2021/0167512 | A1* | 6/2021 | Lee | H04B 7/0408 |
| 2022/0037930 | A1* | 2/2022 | Sounas | H02J 50/27 |

* cited by examiner

TABLE: Comparison of this work with other metamaterial or metasurface based WPT systems.

| Ref | Operating frequency (MHz) | $d_T, d_R$ (mm) | Property of metamaterial or metasurface | Configuration of the metamaterial or metasurface / # of slabs | Transfer /working distance (mm) | Normalized transfer/ working distance | Multi-scale property | PTE with metamaterial or metasurface (%) | Figure of merit |
|---|---|---|---|---|---|---|---|---|---|
| [1] | 27 | 400 | $\mu_{eff} = -1$ | Double sided / 2 | 500 / 230 | 1.25 / 1 | X | 47 | 0.59 |
| [2] | 6.5 | 600 | Negative $\mu_{eff}$ | Single sided / 2 | 1000 / 500 | 1.67 / 0.83 | X | 45 | 0.75 |
| [3] | 7.43 | 150 | $\mu_{eff} = 0, -1$ | Double sided / 1 | 200 / 165 | 1.33 / 1.1 | X | 18.6 | 0.25 |
| [4] | 26.65 | Tx=50 Rx=36 | $\mu_{eff} = -1$ | Double sided / 1 | 79 / 50 | 1.86 / 1.17 | X | 18.23 | 0.34 |
| [5] | 5.57 | 40 | $\mu_{eff} = -1$ | 3D structure / 1 | 40 / 10 | 1 / 0.25 | X | 35 | 0.35 |
| [6] | 6.78 | 600 | $\mu_{eff} = -1, -3$ | Single sided / 1 | 900 / 450 | 1.5 / 0.75 | X | 63.04 | 0.95 |
| [7] | 3 | 500 | $\mu_{eff} = -1$ | Single sided / 2 | 1200 / 560 | 2.4 / 1.12 | X | 49.63 | 1.19 |
| This work Near-field | 6.78 | 180 | $\mu_{eff} = -1$ | Single sided / 2 | 500 / 10 | 2.78 / 0.06 | O | 50.1 | 1.39 |
| This work Far-field | 433 | 180 | $\eta_{eff} \cong 0$ | Single sided / 2 | 1400 / 10 | 7.78 / 0.06 | O | 9.4 | 0.73 |

References:

[1] B. Wang, et al., "Experiments on Wireless Power Transfer with Metamaterials," *Appl. Phys. Lett.*, Vol. 98, No. 25, 2011.

[2] A. L. A. K. Ranaweera, et al., "Experimental Investigation of Compact Metamaterial for High Efficiency Mid-Range Wireless Power Transfer Applications," *Journal of Applied Physics* 116, pp. 043914.1-043914.8, 2014.

[3] Y. Cho et al., "Thin Hybrid Metamaterial Slab with Negative and Zero Permeability for High Efficiency and Low Electromagnetic Field in Wireless Power Transfer Systems," *IEEE Trans. Electromagn. Compat.*, Vol. 60, No. 4, pp. 1001-1009, 2018.

[4] A. Rajagopalan, et al., "Improving Power Transfer Efficiency of a Short-Range Telemetry System Using Compact Metamaterials," *IEEE Transactions on Microwave Theory and Techniques*, Vol. 62, No. 4, pp. 947-955, April 2014, doi: 10.1109/TMTT.2014.2304927.

[5] E. S. Gámez Rodríguez, et al., "Compact Low-Frequency Metamaterial Design for Wireless Power Transfer Efficiency Enhancement," *IEEE Transactions on Microwave Theory and Techniques*, Vol. 64, No. 5, pp. 1644-1654, May 2016, doi: 10.1109/TMTT.2016.2549526.

[6] W. Lee, et al., "Tunable Metamaterial Slab for Efficiency Improvement in Misaligned Wireless Power Transfer," *IEEE Microwave and Wireless Components Letters*, Vol. 30, No. 9, pp. 912-915, Sept. 2020, doi: 10.1109/LMWC.2020.3015680.

[7] Y. Zeng, et al., "Analysis and Design of Asymmetric Mid-Range Wireless Power Transfer System with Metamaterials," *Energies* 14, No. 5, 1348, 2021.

FIG. 12

HIGH EFFICIENCY METASURFACE-BASED MULTI-SCALE WIRELESS POWER TRANSFER

CROSS-REFERENCE TO RELATED APPLICATION

This application claims priority to U.S. provisional application entitled, "High Efficiency Metamaterial-Based Multi-Scale Wireless Power Transfer," having Ser. No. 63/167,994, filed Mar. 30, 2021, which is entirely incorporated herein by reference.

BACKGROUND

In recent years, wireless power transfer (WPT) technologies have gained substantial attention with the growing demand for wireless charging in contemporary electronics. The WPT refers to the transmission of electrical energy without wires as a physical link. In general, the WPT technology can be grouped into two classifications: near-field WPT and far-field WPT. The near-field WPT refers to a WPT that transfers energy wirelessly over a power transfer distance (PTD) shorter than its operating wavelengths. The most broadly utilized technologies belonging to this classification are inductive coupling-based WPT and magnetic resonant coupling (MRC)-based WPT. But, the most critical limitation of the near-field WPT is the power transfer distance (PTD). Although the MRC-based WPT further expands the PTD to a mid-field range PTD (cm~m), the extension of the PTD decreases the coupling between the transmitter (Tx) and receiver (Rx) coils, thereby greatly decreasing power transfer efficiency (PTE) of the WPT and restricting the PTD of the MRC-based WPT.

Concerning the far-field WPT, microwave power transfer, also known as radiative WPT, falls into this classification. In far-field WPT, the power radiated from the Tx antenna transmits across a far distance through the air, and the Rx antenna captures this electromagnetic (EM) wave. However, as microwaves propagate in omni-directions, the far distance transmission suffers from substantial path losses, resulting in comparably low PTE.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 12 shows a table demonstrating improved PTE performances by an exemplary metasurface-based MSWPT system in comparison with previous metasurface-based WPT systems.

DETAILED DESCRIPTION

Figure 1A:
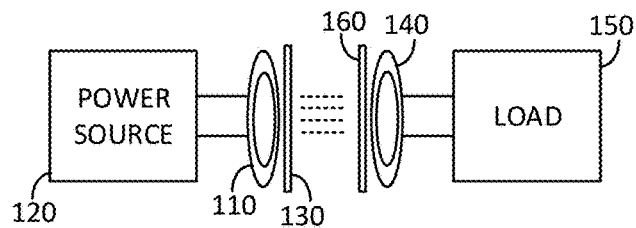
FIG. 1A shows an exemplary multi-scale wireless power transfer system in accordance with various embodiments of the present disclosure.

The present disclosure describes various embodiments of systems, apparatuses, and methods for high efficiency metasurface-based multi-scale wireless power transfer (WPT). In various embodiments of such systems/methods, a metasurface incorporated coil/antenna system is designed to operate in both the near-field scale (e.g., 6.78 MHz AirFuel Alliance standard frequency) and the far-field scale (e.g., 433 MHz ISM band for smart home devices, etc.) for wireless power transfer (WPT). As metasurface slabs are configured to have a beam-focusing property for both a near-field scale (e.g., 6.78 MHz) and a far-field scale (e.g., 433 MHz), the power transfer efficiency (PTE) of the WPT system for both scales can be significantly improved. As a non-limiting example, placing the metasurface slabs that exhibit an electromagnetic (EM) beam focusing property for both 6.78 MHz and 433 MHz at the front sides of transmitter (Tx) and receiver (Rx) coils can substantially enhance the PTE of the WPT for both scales. Further, by having both near-field and far-field WPT in a single WPT system, it is possible to reduce the system size by approximately 50% compared to a system consisting of separate near-field and far-field WPT components.

In recent years, researchers have reported that metasurfaces can be utilized for improving the PTE of the near-field WPT. Metasurfaces are two-dimensional metamaterials, which are artificially designed materials that exhibit unusual EM characteristics, such as negative refraction and evanescent wave amplification, thereby improving the PTE. The metasurfaces are commonly used to enhance the PTE of the near-field WPT by inserting one or more metasurface slabs between Tx and Rx coils. However, the critical problem is that some previously studied metasurface slabs are too huge and bulky in geometry, restricting the practical applicability of metasurface slabs. If the additional bulky metasurface slabs are inserted to the transmission path, it constrains the flexibility and usefulness of the metasurface-based WPT. Furthermore, even though the metasurface slabs further extend the working PTD of the WPT systems, the PTD of the reported metasurface-based WPT systems is still limited, imposing constraints on their practical applicability. Meanwhile, in the field of far-field WPT, metasurfaces have been also introduced for the antenna gain enhancement as a form of metasurface superstrates, where metasurfaces focus the EM fields thereby enhancing the gain of the antenna, taking advantage of the near zero refraction property of the metasurface material.

Accordingly, the present disclosure presents embodiments of a high efficiency multi-scale wireless power transfer (MSWPT) system. In various non-limiting embodiments, the MSWPT system utilizes a metasurface slab having 2×2 spiral unit cells, which operate at 6.78 MHz (AirFuel Alliance standard frequency) for near-field WPT and 433 MHz (ISM band for smart home devices, etc.) for far-field WPT. The power transfer efficiency (PTE) of the MSWPT system is greatly enhanced with the metasurface slab, in which the metasurface slab has an electromagnetic wave focusing capability for both frequency bands. During experimental testing, measured results exhibit that the PTE of the MSWPT is improved from 5.4% to 50.1% with the metasurface slabs at a PTD of 50 cm (near-field scale at 6.78 MHz), i.e. 9.3 times improvement while the PTE at a PTD of 140 cm (far-field scale at 433 MHz) is improved from 2.3% to 9.4% with the metasurface slabs, i.e. 4.1 times improvement. In addition, results show that the metasurface slabs enhance the PTE of the MSWPT even in an angular misalignment condition.

FIG. 1A shows an exemplary multi-scale wireless power transfer system in accordance with various embodiments of the present disclosure. The system includes a transmitter comprising (i) a transmitter coil 110 coupled to a power source 120 and (ii) a transmitter metasurface slab 130 positioned on a front side of the transmitter coil 110 that is configured to amplify and focus a magnetic field generated by the transmitter coil 110 towards a receiver in a non-contact manner. Correspondingly, the system further includes the receiver comprising (i) a receiver coil 140 coupled to a load 150 and (ii) a receiver metasurface slab 160 positioned on a front side of the receiver coil 150 configured to amplify and focus a magnetic field generated by the transmitter coil 110 towards the receiver coil 150 in a non-contact manner. Accordingly, the receiver metasurface slab 160 is configured to operate in a magnetic resonance coupling wireless power transfer mode at a near-field frequency band and operate in a radiative wireless power transfer mode at a far-field frequency band for wireless power transfer based on a current distance between the receiver and the transmitter.

Figure 1B:
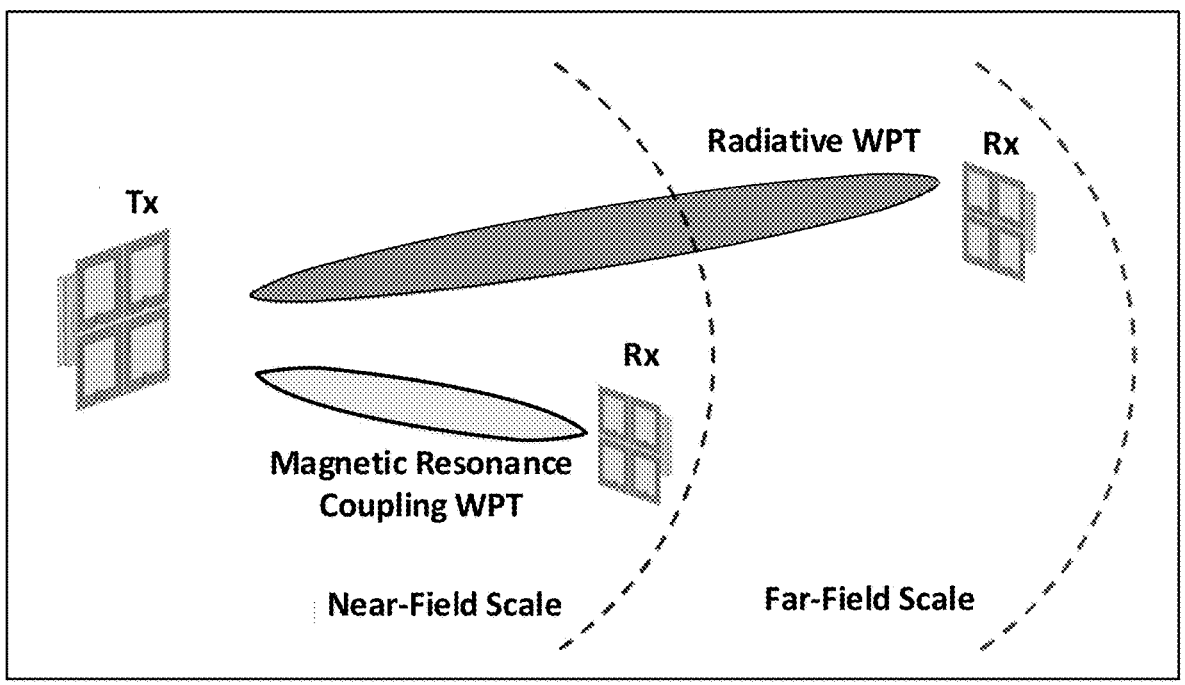
FIG. 1B shows an operation principle of an exemplary metasurface-based multi-scale wireless power transfer (MSWPT) system in accordance with various embodiments of the present disclosure.

Additionally, FIG. 1B shows the operational principle of an exemplary metasurface-based MSWPT. The MSWPT system is configured to work as near-field and far-field WPT according to its PTD. For example, when the Rx is located within the near-field scale, the MSWPT operates in the magnetic resonance coupling WPT mode (e.g., at 6.78 MHz). With the metasurface slabs, the PTE of the MSWPT is greatly increased in the near-field. But, as the PTD increases, the PTE of the MSWPT system decreases substantially even with the metasurface slabs. In order to compensate for this problem, the MSWPT system changes its operating mode to the radiative WPT (e.g., at 433 MHz) when the Rx is placed outside the boundary of the near-field scale (which is the far-field scale). Thus, if the Rx is located outside the boundary of the near-field scale, the MSWPT is operated in the radiative WPT mode (e.g., at 433 MHz). This characteristic is defined as a multi-scale property in the present disclosure.

Figure 2:
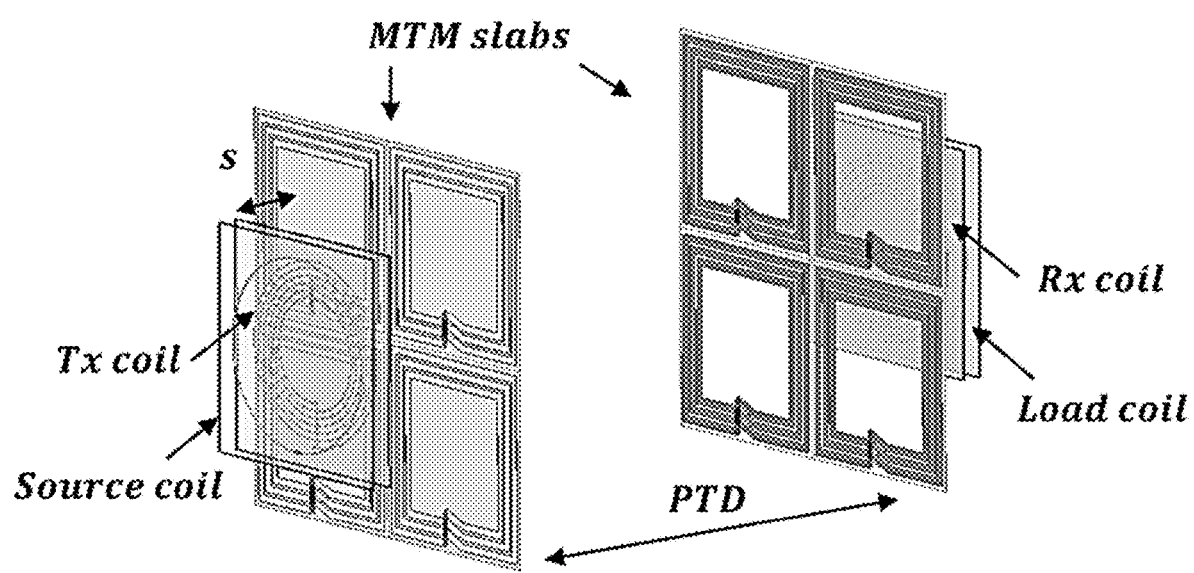
FIG. 2 depicts a geometry of an exemplary MSWPT system in accordance with various embodiments of the present disclosure.

Referring now to FIG. 2, a geometry of an exemplary MSWPT system is depicted in accordance with various embodiments of the present disclosure. Here, a 4-coil WPT system is shown that includes a source coil, a Tx coil, a load coil, and an Rx coil, where the 4-coil WPT system is integrated with metasurface slabs at the front sides of the Tx and Rx coils. Detailed configurations of the metasurface unit cell, Tx/Rx coils, and source/load coils are depicted in FIGS. 3A, 3B, and 3C, respectively.

Figure 3A:
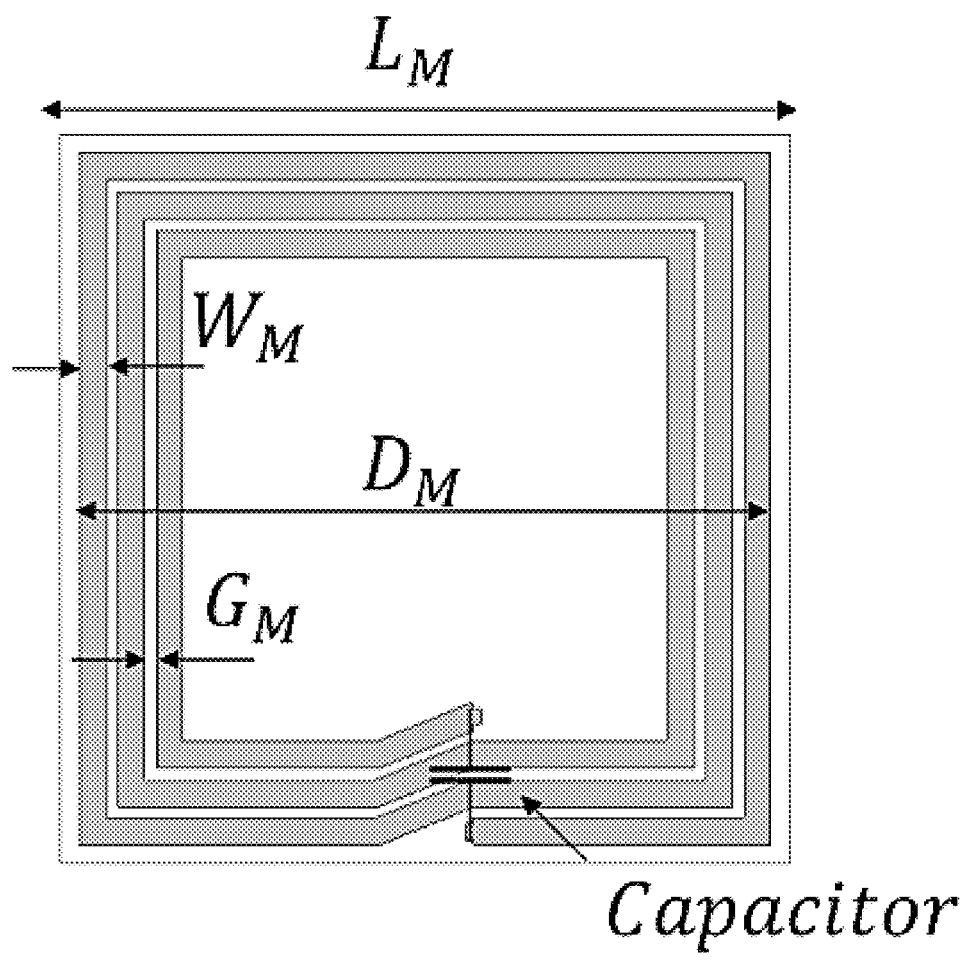
FIG. 3A shows a schematic configuration of a metasurface unit cell of the MSWPT system in accordance with various embodiments of the present disclosure.
Figure 3B:
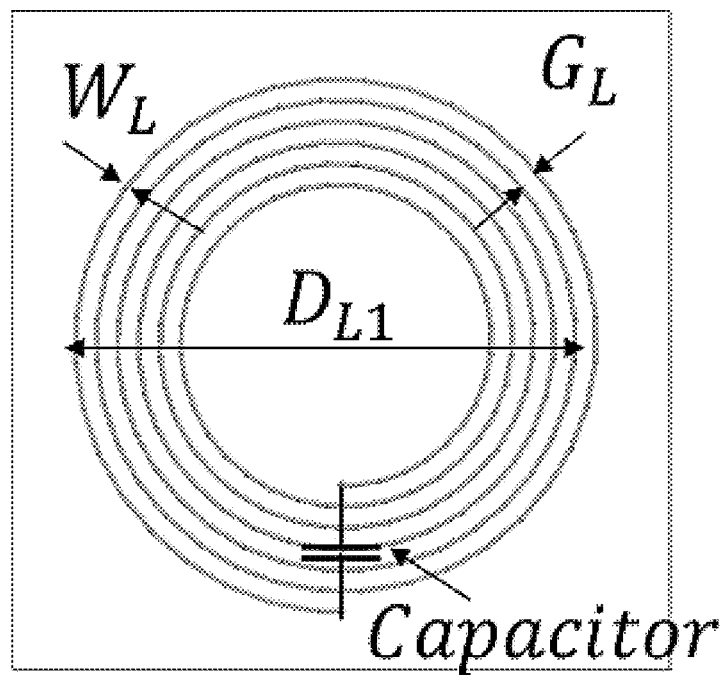
FIG. 3B shows a schematic configuration of the transmitter and receiver coil components of the MSWPT system in accordance with various embodiments of the present disclosure.
Figure 3C:
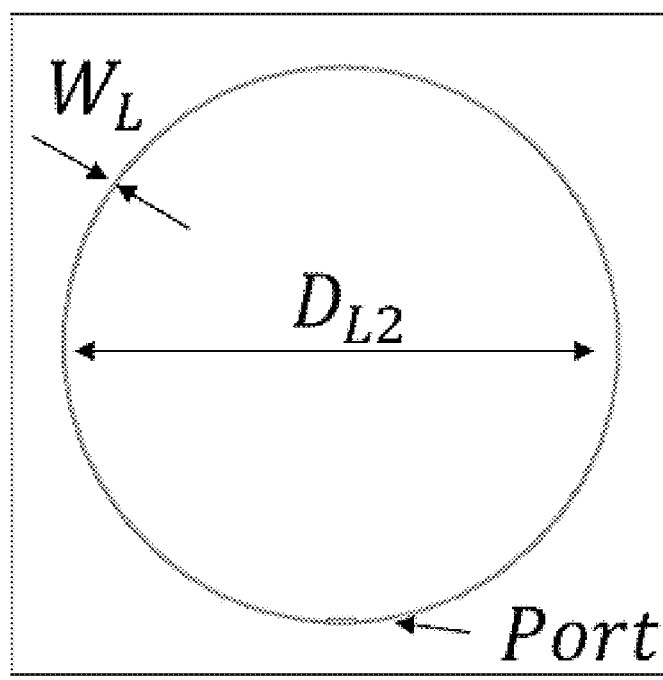
FIG. 3C shows a schematic configuration of the source and load coil components of the MSWPT system in accordance with various embodiments of the present disclosure.
Figure 4A:
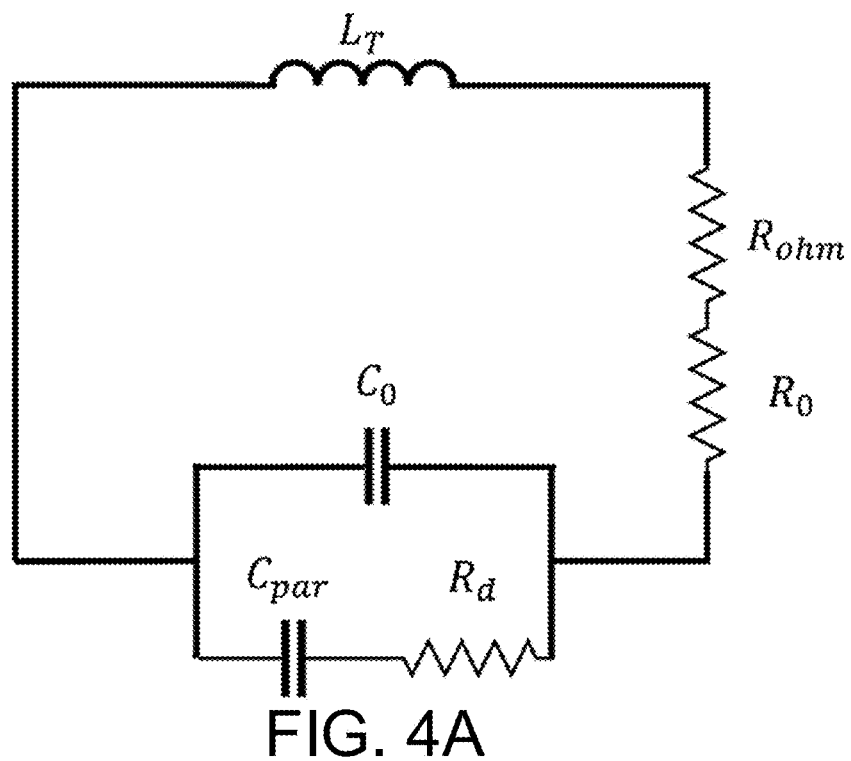
FIGS. 4A-4B shows equivalent circuits of the transmitter, receiver, and metasurface unit cell components of FIGS. 3A-3B.
Figure 4B:
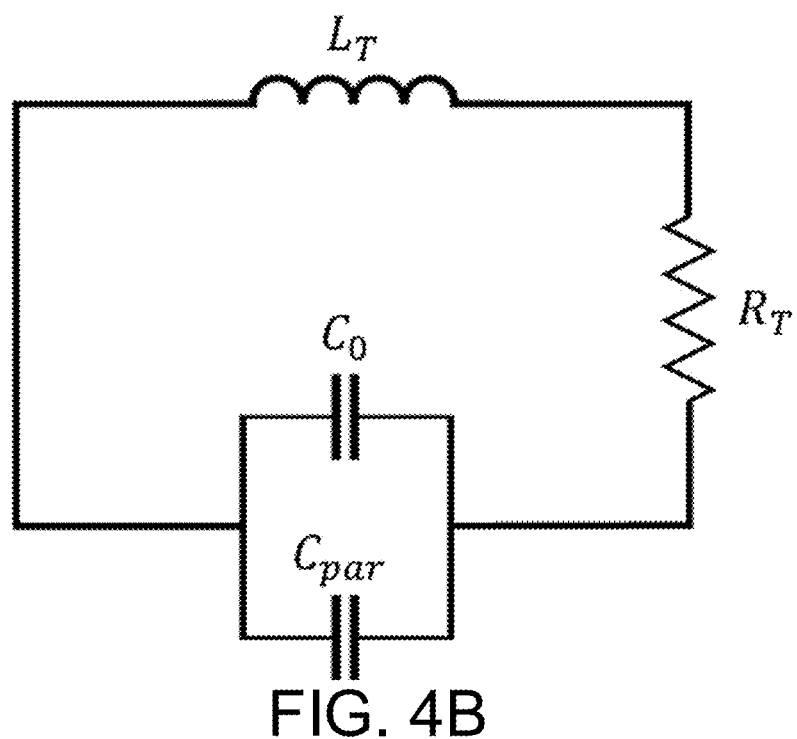

The multi-scale property of the MSWPT system is realized by the capacitors that are connected to the Tx, Rx, and metasurface unit cell, as shown in FIG. 3A and FIG. 3B. Correspondingly, FIG. 4A shows the equivalent circuit of the Tx, Rx, and metasurface unit cell which includes a self-inductance ($L_T$), ohmic loss ($R_{ohm}$), resistance ($R_0$) caused by the connected capacitor ($C_0$), parasitic self-capacitance ($C_{par}$), and the dielectric loss ($R_d$). This equivalent circuit can be simply expressed by an RLC circuit model as depicted in FIG. 4B. In the present disclosure, we utilize the characteristic of capacitive reactance in the radio frequency (RF) circuit. The connected capacitor ($C_0$) has a relatively high capacitance value compared with parasitic self-capacitance ($C_{par}$). The differences in the capacitance values enable the MSWPT to have a multi-scale property. The following equations can be used to obtain the capacitive reactance of the equivalent circuit and connected capacitor:

$$\frac{1}{X_C} = \frac{1}{X_{C_{par}}} + \frac{1}{X_{C_0}} \qquad (1)$$

$$X_{C_0} = \frac{1}{2\pi f C_0} \qquad (2)$$

where $X_C$, $X_{C_{par}}$, and $X_{C_0}$ are the capacitive reactance of the resultant capacitive circuit, $C_{par}$ and $C_0$, respectively, and f is the working frequency. According to Eq. (2), $X_{C_0}$ is a function of its working frequency and the value of the connected capacitor. If the operating frequency is relatively high, such as 433 MHz, $X_{C_0}$ becomes extremely small as both f and $C_0$ terms are very high which implies that the connected capacitor is shorted. It reflects that when the operating frequency is 433 MHz, the resonant frequencies of the Tx, Rx, and metasurface unit cells are not changed by the connected capacitors, but are decided by the inherent coil/metasurface structures, their dimensions, and configurations, i.e. $L_T$, $R_T$, and $C_{par}$ in the circuit (FIG. 4B). Meanwhile, in the comparably low frequency range such as 6.78 MHz, $X_{C_0}$ cannot be ignored as the value of f is small. Thus, the resonant frequencies of the metasurface and Tx, Rx coils can be adjusted by changing the value of the connected capacitor. This characteristic of the capacitive reactance in a distinct frequency scale is manipulated for the functioning of the multi-frequency based self-mode-selective MSWPT. Once the geometries of the Tx, Rx, and metasurface unit cells are decided for the far-field scale, the values of the connected capacitors are carefully chosen for the magnetic resonant coupling (MRC) operation in the near-field scale. By utilizing this characteristic, the metasurface-based MSWPT system is designed to have multi-scale WPT functions for both 6.78 MHz and 433 MHz.

An exemplary schematic configuration of the MSWPT system is integrated with an array of 2×2 metasurface slabs at the front sides of the Tx and Rx components. Accordingly, the MSWPT system (Tx/Rx components) can be designed as shown in FIGS. 3B and 3C. In various embodiments, the WPT system includes a Tx component (source coil and Tx coil) and Rx component (load coil and Rx coil) which are fabricated on a 1 mm thick acrylic slab ($\varepsilon_r$=3.5), and for a multi-scale property, a 220 pF capacitor (FIG. 2C) is connected to Tx and Rx coils in parallel.

Figure 5A:
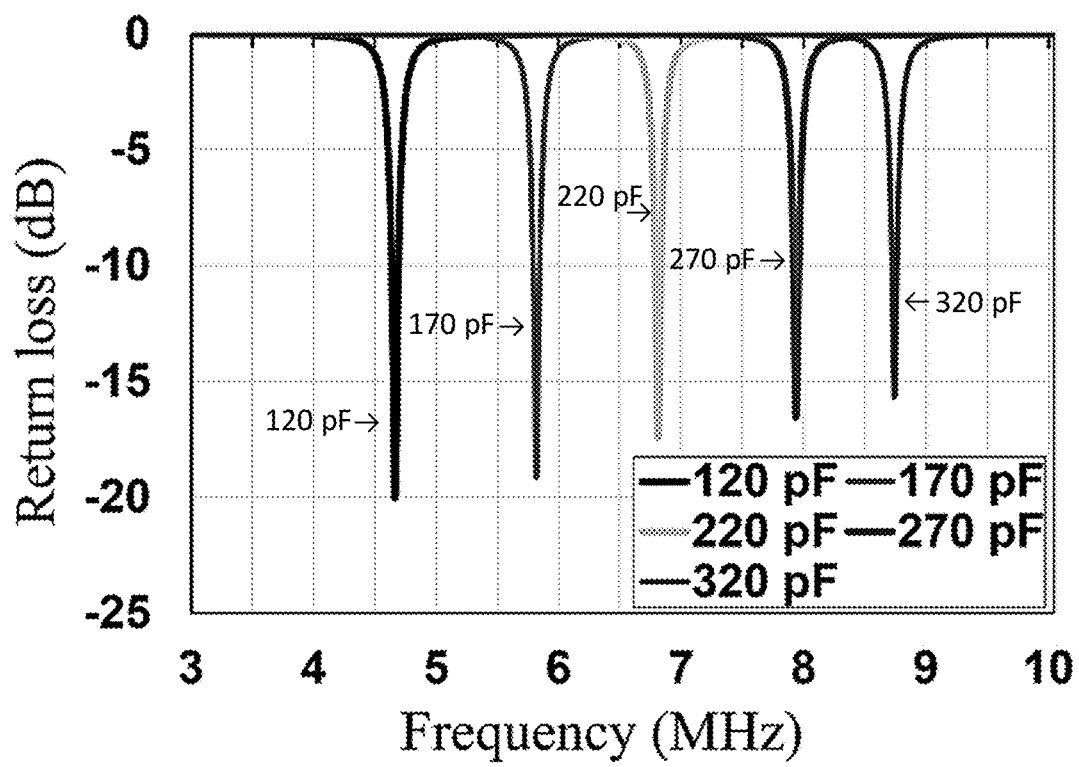
FIGS. 5A-5B shows simulated return losses of the transmitter and receiver components of the MSWPT system with varied capacitor values for 6.78 MHz and 433 MHz respectively.
Figure 5B:
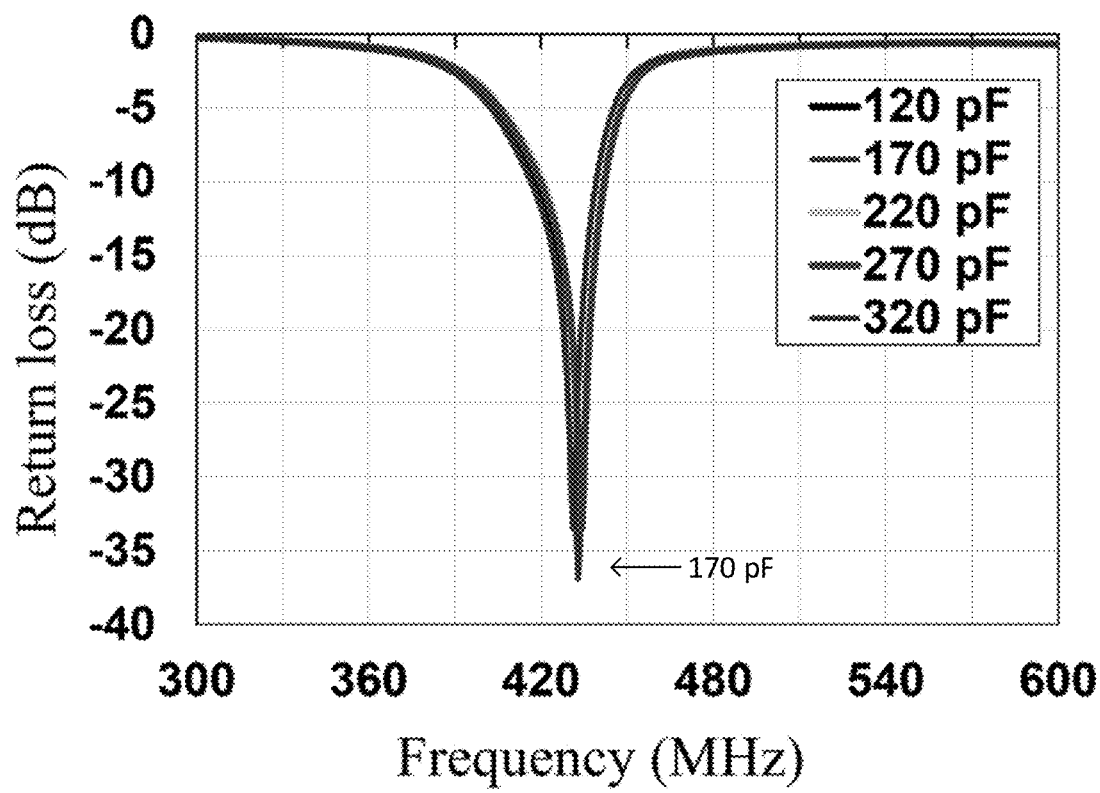
Figure 6A:
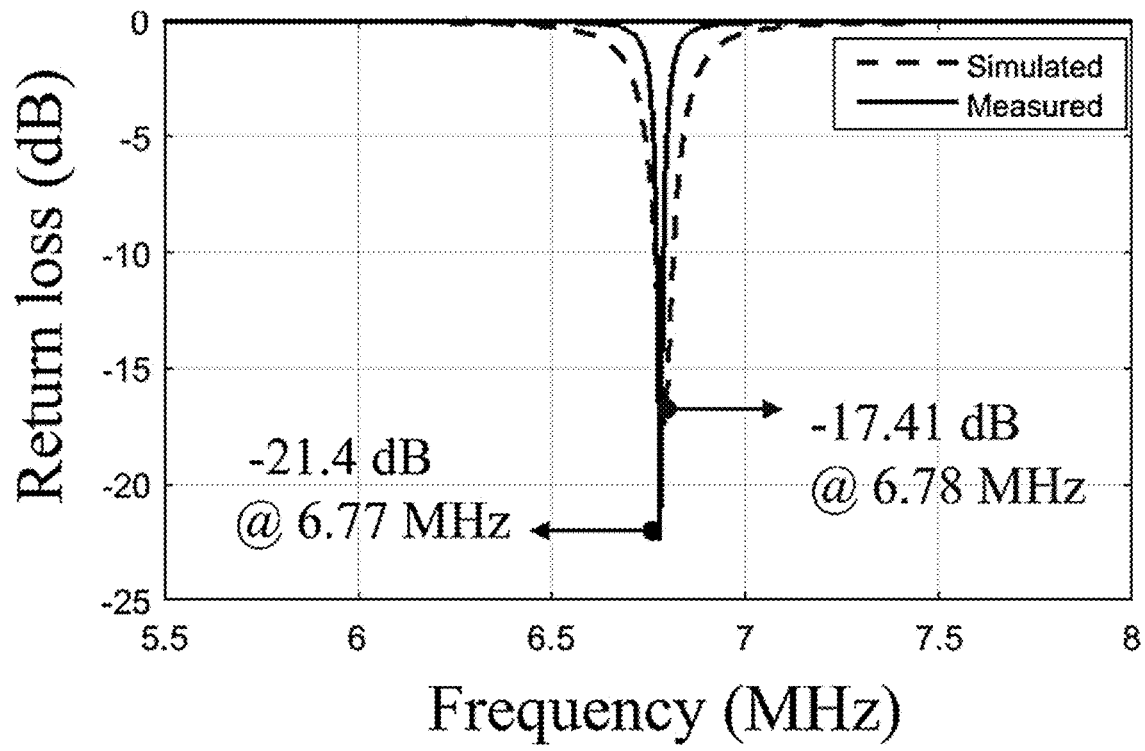
FIGS. 6A-6B show simulated and measured return losses of the transmitter and receiver components of the MSWPT system for the near-field scale (6.78 MHz) and the far-field scale (433 MHz), respectively.
Figure 6B:
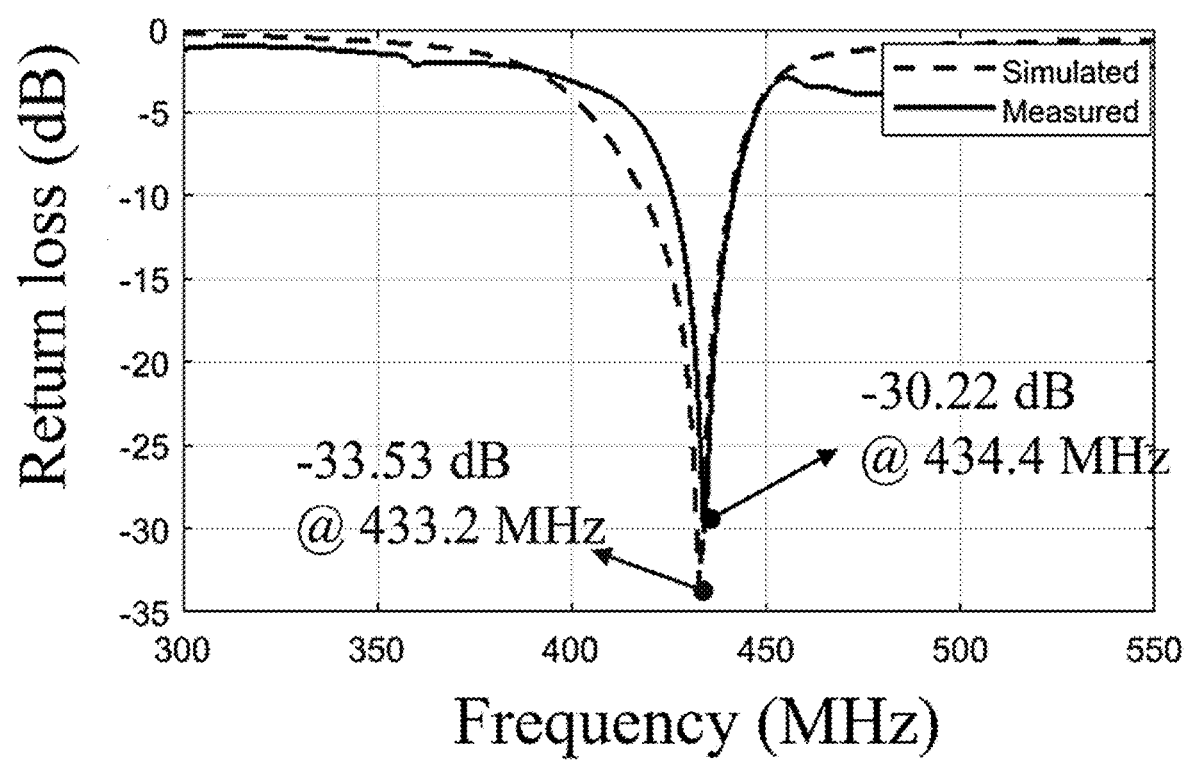

For the validation of the multiscale property, the parametric analysis is carried out using an EM simulator called a High Frequency Structure Simulator (HFSS, Ansys Inc.). Firstly, the dimension and structure of the Tx/Rx are designed to operate at 433 MHz. Then, the value of the connected capacitor is varied from 120 to 320 pF while keeping the dimension of the Tx/Rx. FIGS. 5A-5B shows simulated return losses of the transmitter and receiver components of the MSWPT system with varied capacitor values for 6.78 MHz and 433 MHz respectively. As depicted in FIG. 5B, the resonant frequencies of the Tx/Rx with the varied capacitor values are all the same in the high frequency scale (433 MHz). Because the connected capacitor acts like a short circuit, the resonant frequencies of the Tx/Rx are not affected by the connected capacitor. However, in the low frequency scale (6.78 MHz), the resonant frequency of the Tx/Rx can be tuned by modifying the value of the connected capacitor as shown in FIG. 5A. Using this analysis, the multi-scale feature of the Tx/Rx can be realized. On the basis of the parametric simulation results, a 220 pF capacitor is selected and parallelly connected to Tx/Rx. The simulated and measured return losses of the Tx/Rx for the near-field scale and far-field scale are depicted in FIGS. 6A and 6B, respectively. The results show that the 4-coil WPT system exhibits a multi-scale property. In addition, the measured and simulated return losses of the WPT system are almost identical.

Concerning the metasurface design, an exemplary unit cell utilizes a 3-turns square spiral shaped resonator as the spiral shaped resonator has a relatively higher Q-factor compared with a split ring resonator (SRR). However, in alternative embodiments, different shaped resonators can be utilized. In various embodiments, the metasurface unit cells are realized on a polythene (PE) substrate ($\varepsilon_r$=2.25). In various embodiments, the thicknesses of the polythene and metal (copper) are 0.0762 mm and 0.0799 mm, respectively.

In various embodiments, the metasurface unit cell is engineered to have a multi-scale property for 6.78 MHz and 433 MHz which means the metasurface has a beam focusing property for both frequency bands. Thus, when the metasurface slabs are located at the front of the Tx/Rx coils, they can help the WPT system to have better PTE with the negative and near zero refractive property of the metasurface slab. To verify the beam focusing characteristic of the metasurface, the effective refractive index for both frequency bands are simulated which can be calculated using the following standard retrieval methods:

$$z = \pm \sqrt{\frac{(1+S_{11})^2 - S_{21}^2}{(1-S_{11})^2 - S_{21}^2}} \quad (3)$$

$$n_{eff} = \frac{1}{k_0 d}\{[[\ln(e^{ink_0 d})]'' + 2m\pi] - i[\ln(e^{ink_0 d})]'\} \quad (4)$$

$$e^{ink_0 d} = \frac{S_{21}}{1 - S_{11}\frac{z-1}{z+1}} \quad (5)$$

$$\mu_{eff} = n_{eff} z \quad (6)$$

where z is the impedance; $S_{11}$ and $S_{21}$ are the reflection and transmission coefficients; d is the thickness of the slab at its thickest point; (•)' and (•)" indicate the real part and imaginary part of the complex numbers; $n_{eff}$ is the effective refraction index; $k_0$ is the wavenumber; m is the integer associated with the branch index of n'; and $\mu_{eff}$ is the effective permeability.

In accordance with the present disclosure, the refractive indexes of the metasurface for 6.78 MHz and 433 MHz are carefully designed. The ways of determining the effective refractive index in two distinct frequencies are disparate from each other. Normally, in order to obtain an effective refractive index of the metasurface, both effective permittivity $\varepsilon$ and permeability $\mu$ are necessary. But in the case of near-field WPT (6.78 MHz), the electric and magnetic field decouple each other in a deep subwavelength limit so that only effective permeability is utilized to calculate an effective refractive index. In the meantime, regarding the far-field WPT (433 MHz), the entire system size is not much smaller than its operating wavelength, which does not come under the deep subwavelength condition. Thus, both effective permeability and permittivity are needed for the determination of an effective refractive index of the metasurface in the far-field WPT scale.

Figure 7A:
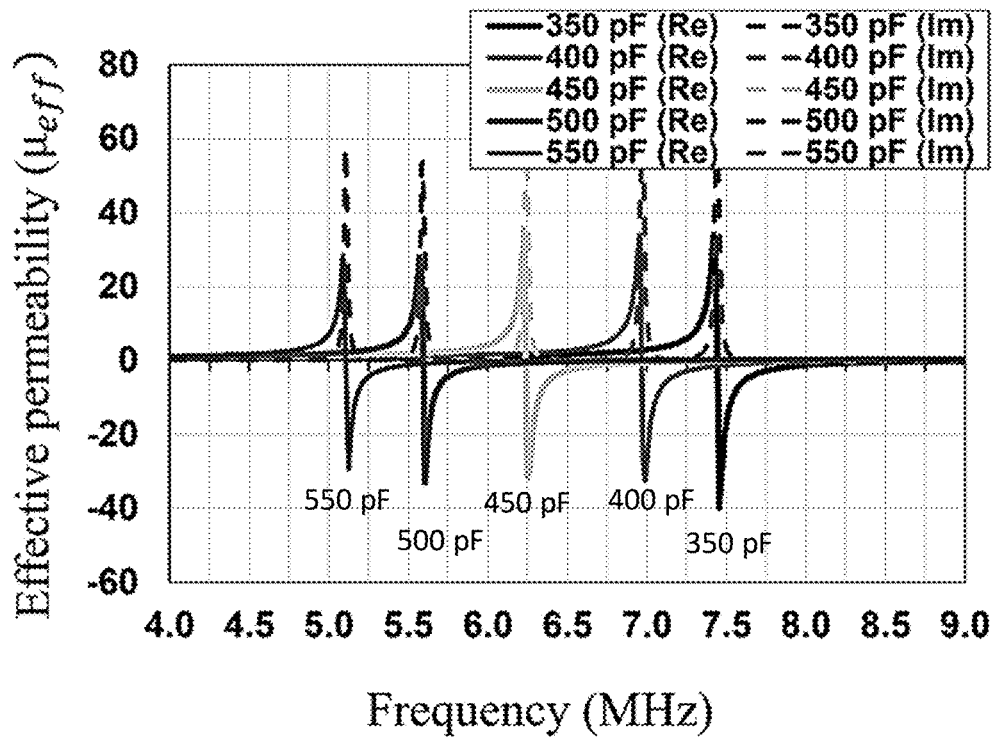
FIGS. 7A-7B show simulated return losses of the metasurface unit cell of the MSWPT system with varied capacitor values for the near-field scale (6.78 MHz) and the far-field scale (433 MHz), respectively.
Figure 7B:
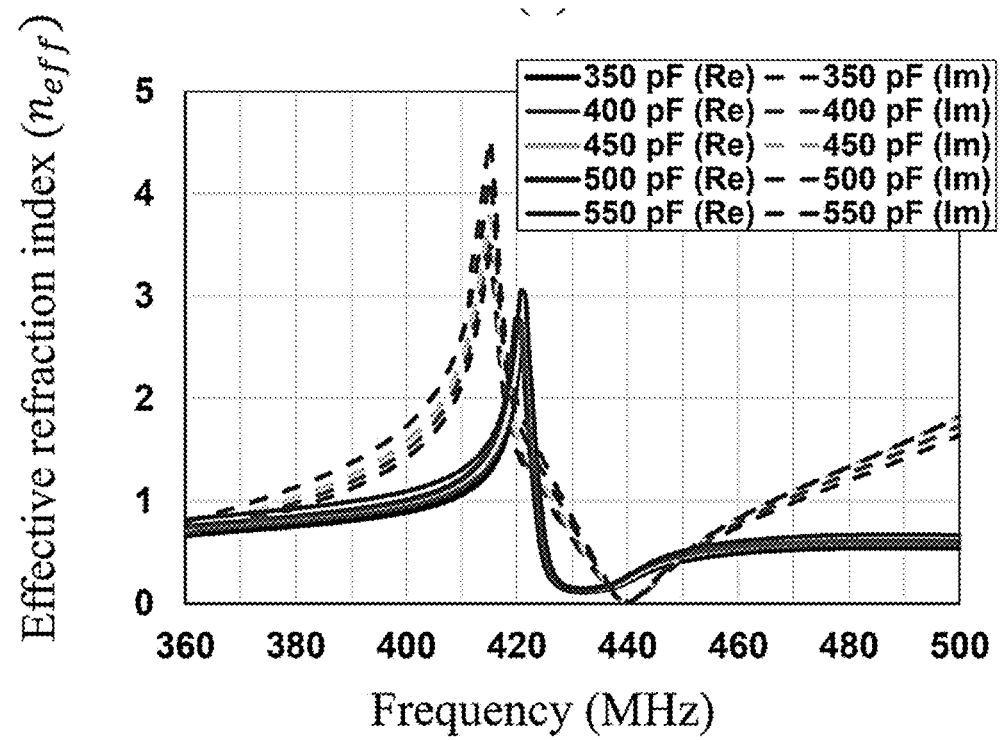

The multi-scale characteristic of the metasurface unit cell is also analyzed parametrically by utilizing HFSS. First, the dimension of the metasurface unit cell is engineered to show near zero refraction index for 433 MHz. After that, the value of the connected capacitor is varied from 350 to 550 pF while keeping the same dimension of the metasurface unit cell. FIGS. 7A-7B show simulated return losses of the metasurface unit cell of the MSWPT system with varied capacitor values for the near-field scale (6.78 MHz) and the far-field scale (433 MHz), respectively. As depicted in FIG. 7B, the values of the effective refraction index in the high frequency scale (433 MHz) are almost the same even when the capacitor values are varied since the connected capacitor acts like a short circuit. However, in the low frequency scale (6.78 MHz), the values of the effective permeability can be changed by sweeping the value of the connected capacitor as depicted in FIG. 7A. On the basis of the parametric analysis, a 450 pF capacitor is parallelly connected to each metasurface unit cell for the multi-scale property.

Figure 8A:
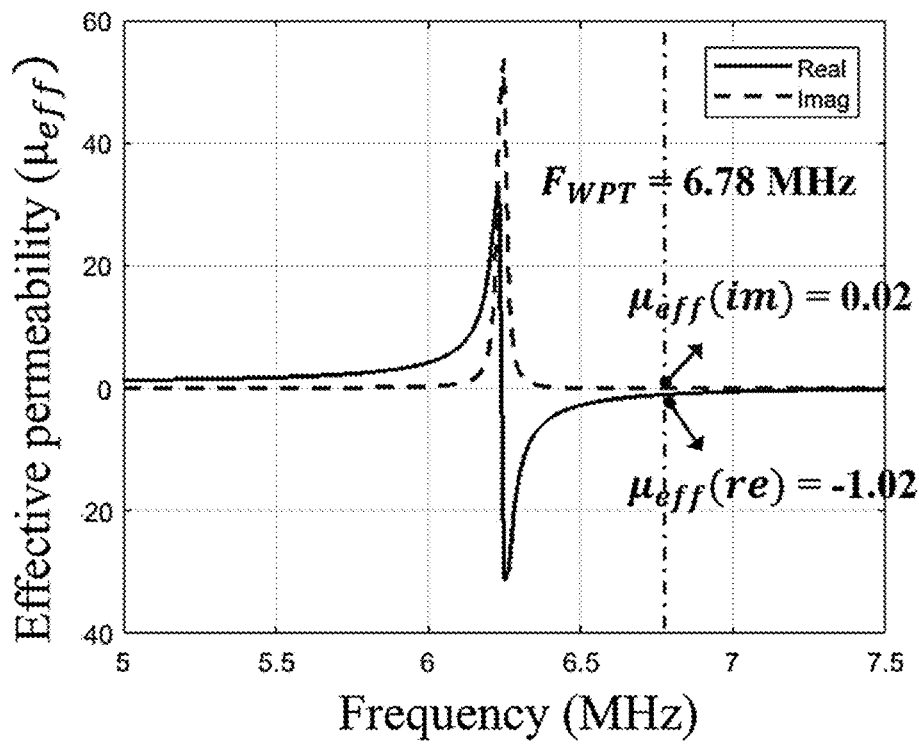
FIG. 8A show simulation results of an exemplary metasurface unit cell for effective permeability results for the near-field scale (6.78 MHz).
Figure 8B:
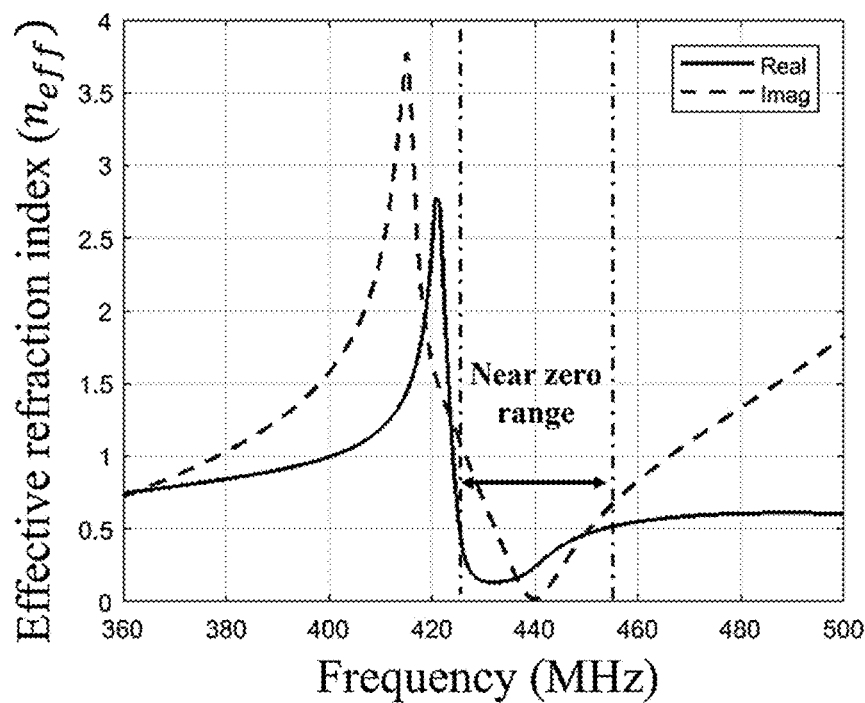
FIG. 8B show simulation results of an exemplary metasurface unit cell for effective refraction index result for the far-field scale (433 MHz).

The simulation results are shown in FIGS. 8A-8B for 6.78 MHz and 433 MHz respectively. As shown in FIG. 8A, the real part of the $\mu_{eff}$ is −1.02 at 6.78 MHz, which indicates an effective refractive index value of −1.02 at 6.78 MHz. In addition, the metasurface has the imaginary part of the effective permeability of 0.02, which implies that the designed metasurface has a low magnetic loss at 6.78 MHz. As for far-field WPT case (433 MHz), the real part of effective refractive index is carefully engineered to exhibit near zero values ($\eta_{eff}(re) \leq 0.5$) in the frequency range of 425.6 to 457.5 MHz as depicted in FIG. 8B, which indicate that the metasurface slabs have the beam-focusing property and can change the direction of the EM field at the boundary to negative and near zero. Therefore, the PTE of the MSWPT for both 6.78 MHz and 433 MHz can be significantly improved.

For PTE measurements, we utilize a vector network analyzer (HP E8361A, Agilent, Inc.). The PTE can be extracted from the measurement data by using the following equation:

$$PTE = |S_{21}|^2 \times 100\% \tag{7}$$

Figure 9:
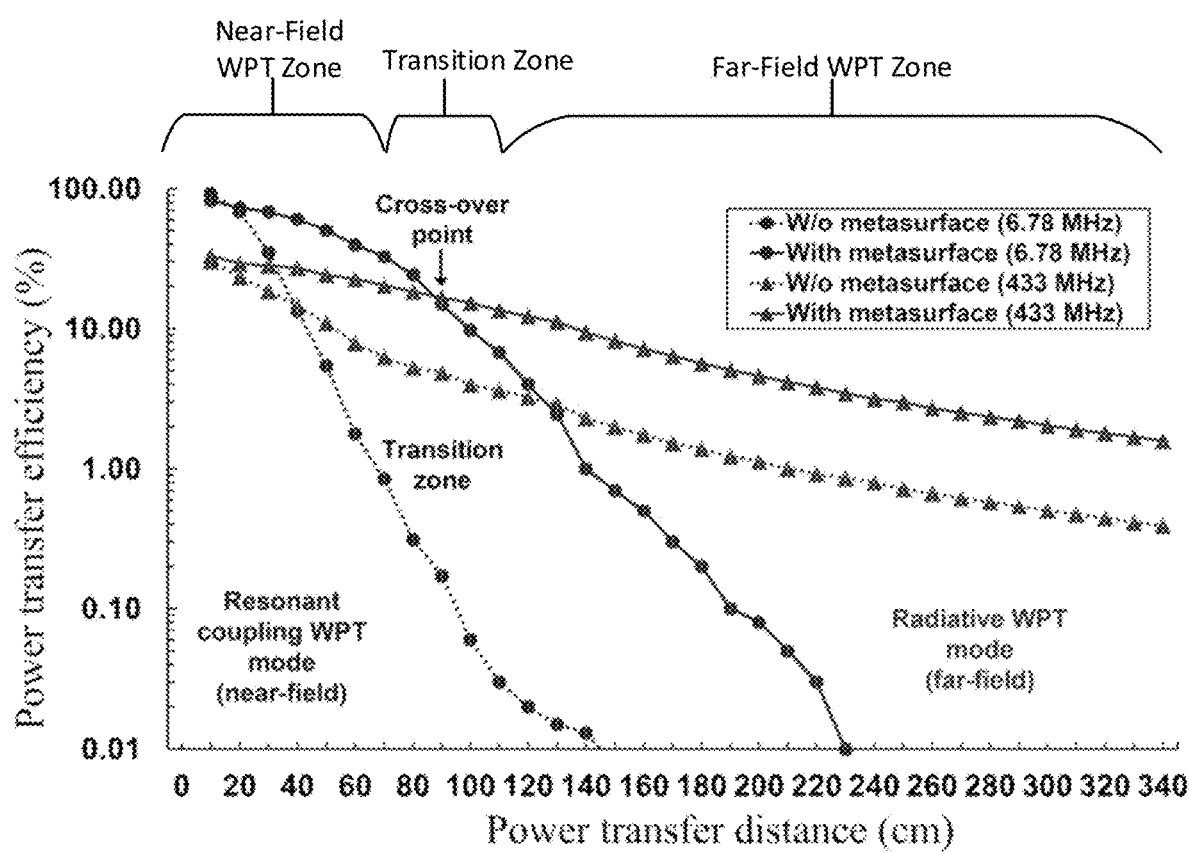
FIG. 9 shows measured power transfer efficiency (PTE) of an exemplary MSWPT system without and with the metasurface slabs.

The PTE of the MSWPT with and without the metasurface slabs is measured as a function of PTD that ranges from 0 to 340 cm, where the metasurface slabs consist of 2×2 metasurface arrays. The PTE of both near-field WPT mode (6.78 MHz) and far-field WPT mode (433 MHz) are measured separately. Accordingly, as depicted in FIG. 9, the MSWPT with the metasurface slabs exhibits enhanced PTE for entire PTDs except for 10 cm (threshold distance) in the near-field WPT mode (6.78 MHz), indicating that the inserted metasurface slabs concentrate and amplify the magnetic fields, hence enhancing the PTE of the MSWPT. At a PTD of 50 cm, the PTE increases from 5.4% to 50.1% which is a factor of 9.3 improvement when the metasurface slabs are inserted. But, as the PTD increases to 140 cm, the PTE of the MSWPT decreases below 1% even with the metasurface slabs placed.

Furthermore, the PTE of the radiative WPT mode (433 MHz) starts to get higher than that of the MRC-WPT mode (6.78 MHz) from a PTD of 90 cm (cross-over point). The MSWPT in the radiative WPT mode exhibits steady PTE within the far-field scale. It is notable that the MSWPT with metasurface slabs exhibits superior PTE compared with the MSWPT without metasurface slabs for entire PTDs within the far-field scale with the enhanced antenna gain. The improved gain can be obtained using the following Friis equation:

$$P_r = \frac{G_t G_r \lambda^2}{(4\pi r)^2} P_t \tag{8}$$

where $P_t$ and $P_r$ are the transmitted and received RF power; $G_t$ and $G_r$ are the Tx and Rx antenna gain; $\lambda$ is the wavelength; r is the transfer distance. According to Eq. (8), the gain of the Tx/Rx antennas is enhanced from 5.86 dBi to 8.91 dBi when the metasurface slabs are inserted. It indicates that the MSWPT system with metasurface slabs is capable of transferring 4.1 times as much power as the MSWPT without metasurface slabs in the radiative WPT mode On the basis of the measurement results in FIG. 9, the PTD is classified into three different regions. A first region (0~70 cm) in FIG. 9 is categorized as the near-field WPT zone. In this area, the MSWPT functions as the MRC-WPT mode since the MRC-WPT mode exhibits better PTE performance than the radiative WPT mode. A second region (70~110 cm) is categorized as a transition zone. In this zone, the MSWPT modes have to be switched from the MRC-WPT mode to the radiative WPT mode as the radiative WPT begins to surpass the MRC-WPT from the cross-over point (90 cm). Finally, a third region (110 cm~) can be categorized as the far-field zone. In this zone, the MSWPT will function as the radiative WPT mode since the performance of the radiative WPT mode surpasses that of the MRC-WPT mode.

The measurement results indicate that the WPT mode transition from the near-field MRC-WPT (6.78 MHz) to the 433 MHz far-field microwave WPT (433 MHz) is beneficial in the MSWPT when the PTD is father than the cross-over point. This means that the MSWPT is capable of transferring wireless power seamlessly regardless of PTD due to its multi-scale characteristic.

Figure 10A:
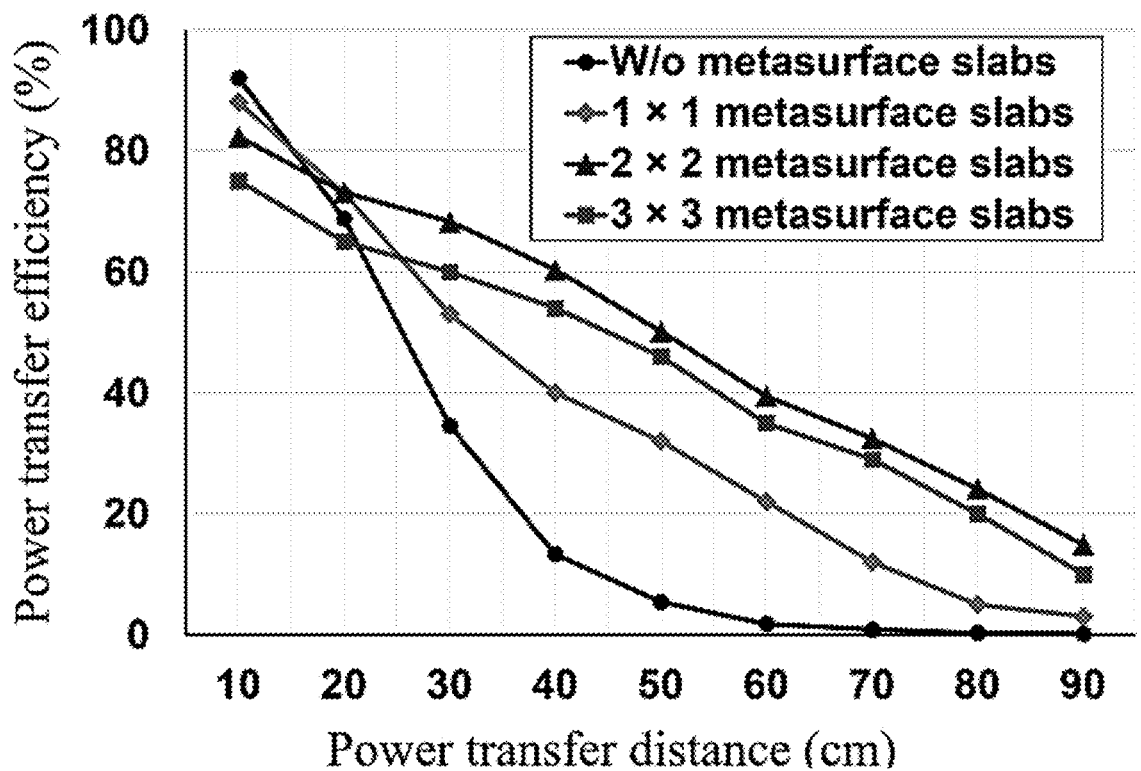
FIGS. 10A-10B show measured PTE of an exemplary MSWPT system with and without 1×1, 2×2, 3×3 metasurface slabs for the near-field scale (6.78 MHz) and the far-field scale (433 MHz), respectively.
Figure 10B:
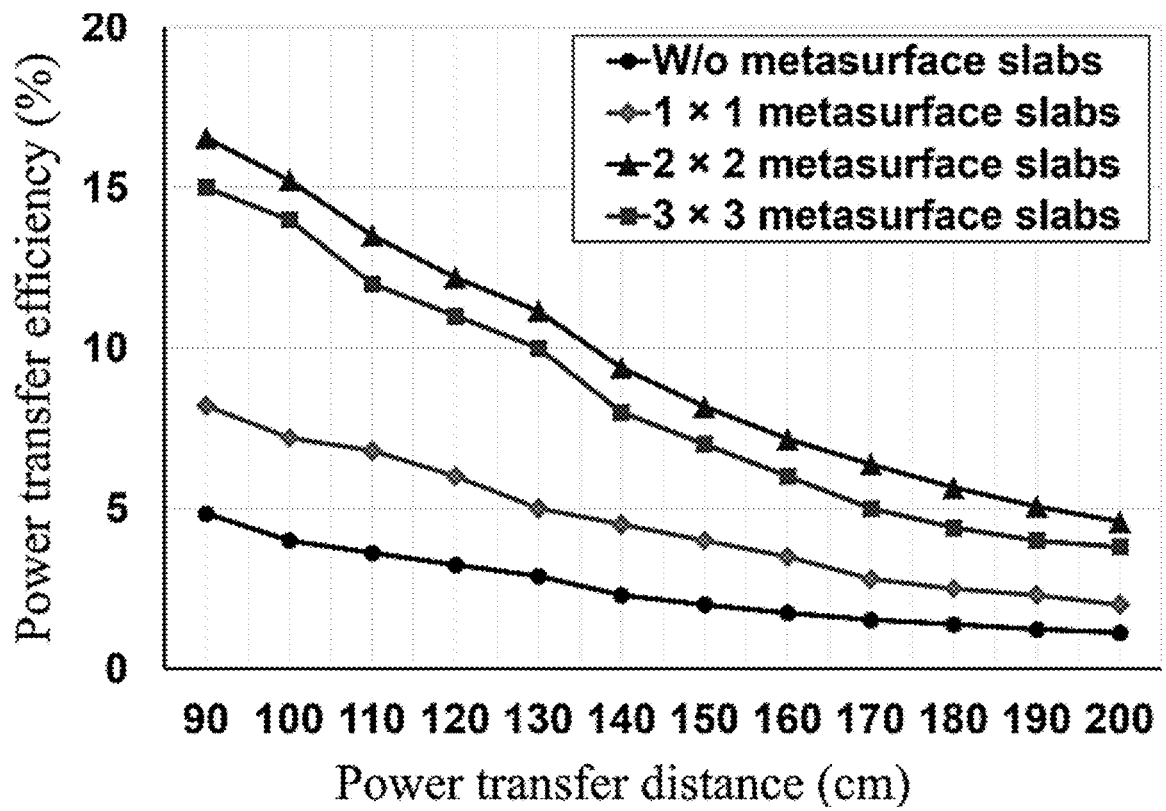

To investigate the effects of the number of metasurface unit cells on the PTE, the PTE of the MSWPT with 1×1, 2×2, 3×3 metasurface slabs, and without metasurface slabs is measured and compared in the near-field and far-field scales. As depicted in FIG. 10A and FIG. 10B, the PTE of the MSWPT with the 2×2 metasurface slabs exhibits the highest PTE and is followed by the PTE of the MSWPT with the 3×3 metasurface slabs, the PTE of the MSWPT with the 1×1 slab, and the PTEs of the MSWPT without metasurface slabs for both scales. However, the increased PTE of the WPT with 1×1 metasurface slabs is much smaller than the PTEs of the MSWPT with 2×2 and 3×3 metasurface slabs. As only one metasurface unit cell is utilized, the EM waves could not be effectively focused when they pass the 1×1 metasurface slabs. Interestingly, the PTE of the MSWPT with the 3×3 metasurface slabs shows worse PTE than that with the 2×2 metasurface slabs. If the number of metasurface unit cells in the array increases from 2×2 to 3×3, the EM beam focusing coverage is expected to be expanded. Unlike the expectation, the PTE improvement could not be achieved using 3×3 metasurface slabs as the beam focusing coverage of the 2×2 metasurface slabs is already enough to cover the size of the Tx and Rx coils. Moreover, the experimental result indicates that the 3×3 metasurface slabs have increased loss compared with the 2×2 metasurface slabs thereby degrading the PTE of the MSWPT system. On the basis of the analysis in this section, the number of the metasurface unit cell in the array for the MSWPT may be preferably determined to be 2×2 in certain implementations.

Figure 11A:
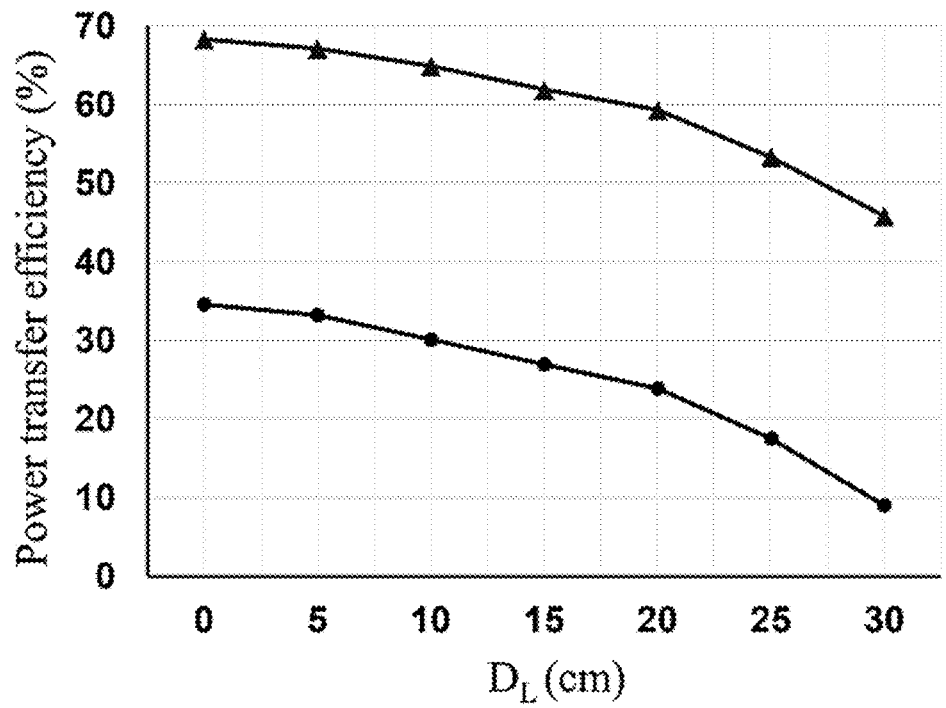
FIGS. 11A-11D show measured PTE of an exemplary MSWPT system with (A) lateral misalignment ($D_L$) at 30 cm, (B) angular misalignment (θ) at 30 cm, (C) lateral misalignment ($D_L$) at 140 cm, and (D) angular misalignment (θ) at 140 cm, respectively.
Figure 11B:
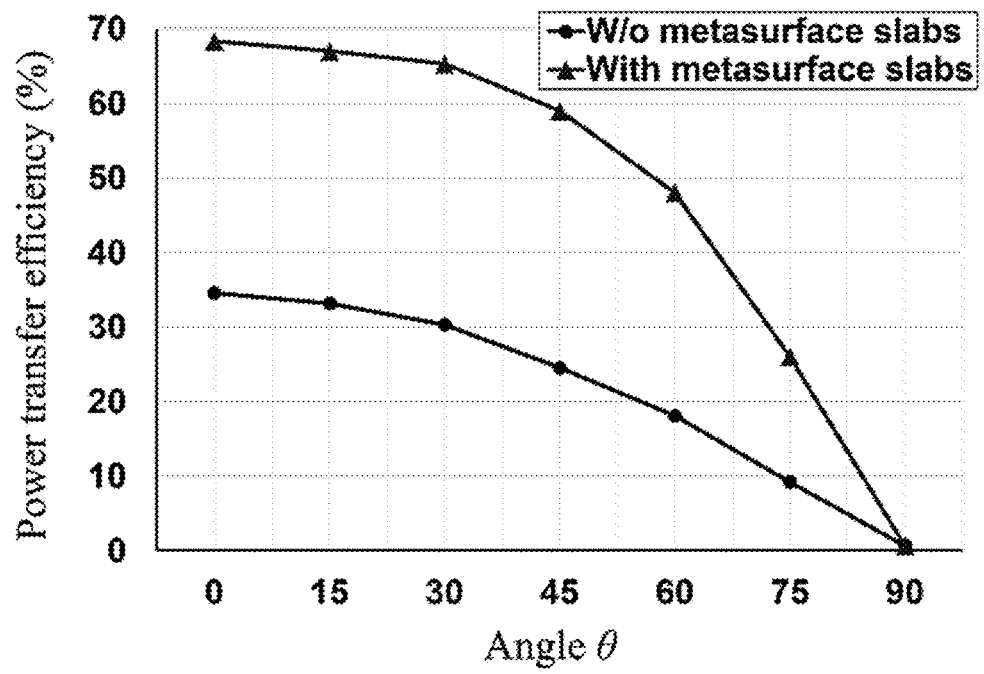
Figure 11C:
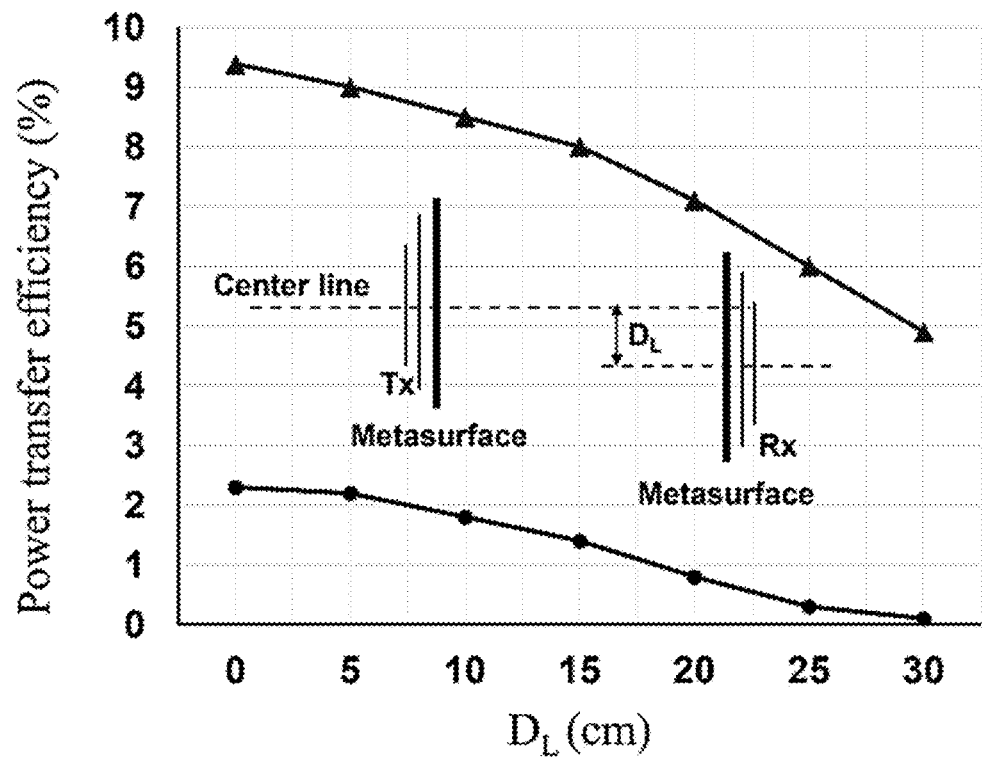
Figure 11D:
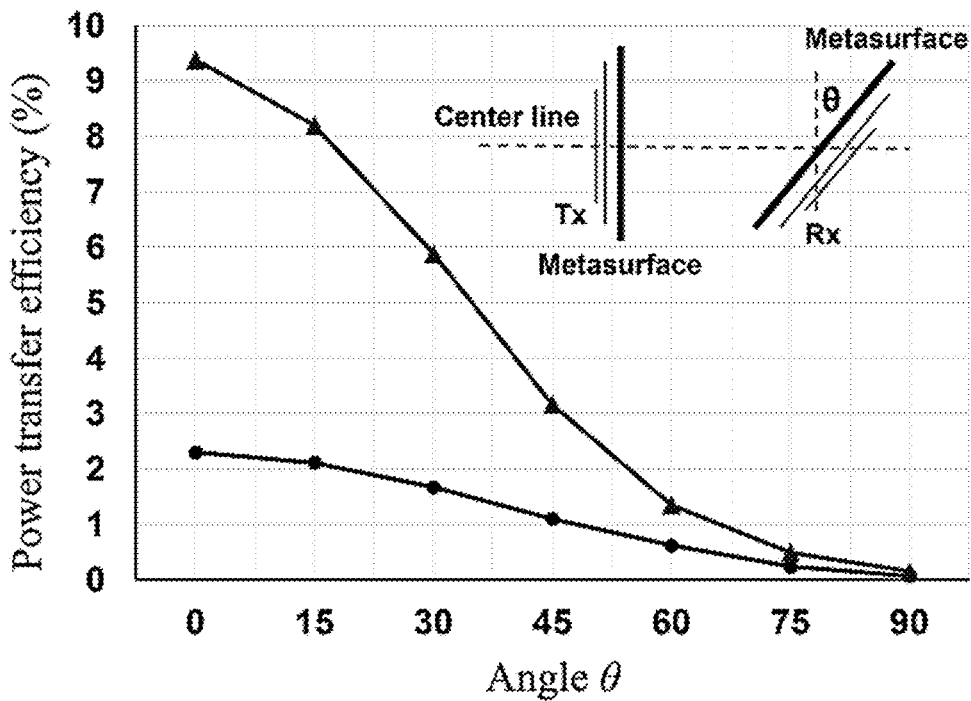

In practice, a perfect alignment between the Tx and Rx is difficult to achieve, and the PTE of the WPT is directly affected by the misalignments in the WPT system. Accordingly, the effects of the misalignments on the PTE of the MSWPT have been studied. For example, the effects of the lateral and angular misalignment on the PTE of an exemplary MSWPT system without and with the metasurface slabs have been investigated at a PTD of 30 cm (near-field scale) and 140 cm (far-field scale). As shown in FIGS. 11A and 11C, the PTE of the MSWPT is degraded for both cases (with and without the metasurface slabs) as the misaligned lateral distance ($D_L$) increases. However, it is noticeable that the PTE of the MSWPT increases substantially for entire PTEs in both scales when the metasurface slabs are inserted. In addition, the studies of the angular misalignment ($\theta$) are also exhibited in FIGS. 11B and 11D. Here, the PTE of the MSWPT without and with the metasurface slabs decreases as the angle of the Rx becomes larger. It is shown that the impacts of the metasurface slabs on the PTE of the MSWPT degraded as the angular misalignment becomes severe. Particularly, the enhanced PTE owing to the metasurface slabs is close to 0% when the misaligned angle is 90°. This indicates that the EM waves radiated by the Tx cannot be captured by the Rx when the Rx coil is perpendicular to the Tx even though the EM waves are amplified and concentrated by the metasurface slabs. However, it is concluded that the metasurface slabs effectively mitigate the impacts of the misalignments on the MSWPT system for all other cases.

Next, the metasurface-based MSWPT is compared with previously studied metamaterial or metasurface based WPT systems. For a fair comparison, the PTD and the working distance (distance between Rx and metasurface) are normalized to the geometrical mean of Tx and Rx diameter as described in the following equation:

$$D_{norm} = \frac{D}{\sqrt{d_T \cdot d_R}} \quad (9)$$

where $D_{norm}$, D, $d_T$ and $d_R$ are the normalized distance, distance, Tx diameter, and Rx diameter, respectively. Moreover, a figure of merit (FoM) has been utilized in order to compare metasurface-based WPT systems taking the PTE, the coil diameter, and the PTD into consideration:

$$FoM = D_{norm} \times PTE \quad (10)$$

As shown in the table of FIG. 12, the demonstrated metasurface-based MSWPT system of the present disclosure has exhibited improved PTEs compared to previously reported studies on the whole. In addition, the working distance of the metasurface-based MSWPT is much smaller compared to those of earlier studies, which implies that the demonstrated MSWPT is more suitable for practical WPT systems. Especially, it is worth emphasizing that this is the firstly reported WPT system functioning at both near-field and far-field scale WPT in a single system with a successful demonstration of transferring wireless power seamlessly in multi-scale regions.

As shown in the table, the exemplary metasurface-based MSWPT has shown overall improvement compared to the other works while being the first work enabling both near-field and far-field scale WPT in a single device with successful demonstration of seamless WPT in multi-scale zones. Accordingly, the present disclosure demonstrates a high efficiency metasurface-based MSWPT system, and the experimental results show that the metasurface-based MSWPT system is capable of transferring wireless power efficiently in the near-field and far-field scales. In brief, the measurement results prove that the metasurface-based WPT system can operate as both a near-field WPT and a far-field WPT in a single system. The measured results exhibit that the PTE of the MSWPT is improved from 5.4% to 50.1% with the metasurface slabs at a PTD of 50 cm (near-field scale at 6.78 MHz), i.e. 9.3 times improvement while the PTE at a PTD of 140 cm (far-field scale at 433 MHz) is improved from 2.3% to 9.4% with the metasurface slabs, i.e. 4.1 times improvement. Furthermore, the PTE measurement in the misaligned condition proves that the metasurface slabs enhance the PTE of the MSWPT even in the misaligned condition. In accordance with embodiments of the present disclosure, an exemplary MSWPT system can open new possibilities for a variety of applications and industries with increased PTE and PTD in various situations, including smart home WPT applications, among others.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the principles of the present disclosure. All such modifications and variations are intended to be included herein within the scope of this disclosure.

The invention claimed is:

1. A wireless power transfer system comprising:
a transmitter comprising (i) a transmitter coil coupled to a power source and (ii) a transmitter metasurface slab positioned on a front side of the transmitter coil that is configured to amplify and focus a magnetic field generated by the transmitter coil towards a receiver in a non-contact manner; and
the receiver comprising (i) a receiver coil coupled to a load and (ii) a receiver metasurface slab positioned on a front side of the receiver coil configured to amplify and focus a magnetic field generated by the transmitter coil towards the receiver coil in a non-contact manner,
wherein the receiver metasurface slab is configured to operate in a magnetic resonance coupling wireless power transfer mode at a near-field frequency band and operate in a radiative wireless power transfer mode at a far-field frequency band for wireless power transfer based on a current distance between the receiver and the transmitter,
wherein the transmitter metasurface slab and the receiver metasurface slab each comprise an array of metasurface unit cells,
wherein the receiver metasurface slab has a capacitor connected to each of the metasurface unit cells in parallel, wherein a value of the capacitor is selected to tune a resonant operating frequency of the receiver to the near-field frequency band, wherein for the selected value of the capacitor, the receiver metasurface slab operates in both the magnetic resonance coupling wireless power transfer mode at the near-field frequency band and the radiative wireless power transfer mode at the far-field frequency band for wireless power transfer,
wherein a dimension of the receiver coil determines a resonant operating frequency of the receiver for the far-field frequency band.

2. The system of claim 1, wherein the transmitter metasurface slab comprises an array of metasurface unit cells.

3. The system of claim 1, wherein each metasurface unit cell has a negative refraction index for the near-field frequency band.

4. The system of claim 3, wherein a resonant operating frequency of the wireless power transfer system is 6.78 MHz for the near-field frequency band.

5. The system of claim 1, wherein each metasurface unit cell has a near zero refraction index for the far-field frequency band.

6. The system of claim 5, wherein a resonant operating frequency of the wireless power transfer system is 433 MHz for the far-field frequency band.

7. The system of claim 1, wherein each of the receiver coil and the transmitter coil has a capacitor connected in parallel.

8. The system of claim 7, wherein the capacitor comprises a 220 pF capacitor.

9. The system of claim 1, wherein each metasurface unit cell comprises a spiral shaped metasurface unit cell.

10. The system of claim 1, wherein the capacitor connected to each of the metasurface unit cells in parallel is shorted at the far-field frequency band.

11. The system of claim 1, wherein the resonant operating frequency of the receiver metasurface slab for the magnetic resonance coupling wireless power transfer mode is changed by adjusting the value of the capacitor connected to each of the metasurface unit cells in parallel.

12. A method for wireless power transfer communications comprising:
- providing a transmitter comprising a transmitter coil coupled to a power source;
- positioning a transmitter metasurface slab positioned on a front side of the transmitter coil, wherein the transmitter metasurface slab is configured to amplify and focus a magnetic field generated by the transmitter coil towards a receiver in a non-contact manner;
- providing the receiver, wherein the receiver comprises a receiver coil coupled to a load; and
- positioning a receiver metasurface slab on a front side of the receiver coil, wherein the receiver metasurface slab is configured to amplify and focus a magnetic field generated by the transmitter coil towards the receiver coil in a non-contact manner,
- wherein the receiver metasurface slab is configured to operate in a magnetic resonance coupling wireless power transfer mode at a near-field frequency band and operate in a radiative wireless power transfer mode at a far-field frequency band for wireless power transfer based on a current distance between the receiver and the transmitter,
- wherein the receiver metasurface slab comprises an array of metasurface unit cells,
- wherein the receiver metasurface slab has a capacitor connected to each of the metasurface unit cells in parallel, wherein a value of the capacitor is selected to tune a resonant operating frequency of the receiver to the near-field frequency band, wherein for the selected value of the capacitor, the receiver metasurface slab operates in both the magnetic resonance coupling wireless power transfer mode at the near-field frequency band and the radiative wireless power transfer mode at the far-field frequency band for wireless power transfer,
- wherein a dimension of the receiver coil determines a resonant operating frequency of the receiver for the far-field frequency band.

13. The method of claim 12, wherein the transmitter metasurface slab comprises an array of metasurface unit cells.

14. The method of claim 12, wherein each metasurface unit cell has a negative refraction index for the near-field frequency band.

15. The method of claim 14, wherein a resonant operating frequency of the receiver is 6.78 MHz for the near-field frequency band.

16. The method of claim 12, wherein each metasurface unit cell has a near zero refraction index for the far-field frequency band.

17. The method of claim 16, wherein a resonant operating frequency of the receiver is 433 MHz for the far-field frequency band.

18. The method of claim 12, wherein each of the receiver coil and the transmitter coil has a capacitor connected in parallel.

19. The method of claim 12, wherein the capacitor connected to each of the metasurface unit cells in parallel is shorted at the far-field frequency band.

20. The method of claim 12, further comprising changing the resonant operating frequency of the receiver metasurface slab for the magnetic resonance coupling wireless power transfer mode by adjusting the value of the capacitor connected to each of the metasurface unit cells in parallel.

* * * * *